US012686120B2

(12) United States Patent
    Koenig et al.

(10) Patent No.:  US 12,686,120 B2
(45) Date of Patent:       Jul. 21, 2026

(54) METHOD FOR THE OPEN-LOOP AND CLOSED-LOOP CONTROL OF A DEVICE INCLUDING A MOVEMENT MODULE DURING THE INTERACTION OF THE DEVICE WITH A HUMAN, AND DEVICE CONTROLLED IN SUCH A MANNER

(71) Applicant: ReActive Robotics GmbH, Munich (DE)

(72) Inventors: Alexander Koenig, Munich (DE); Helfried Peyrl, Oberhaching (DE); Erfan Shahriari, Munich (DE); Sami Haddadin, Hannover (DE); Dinmukhamed Zardykhan, Munich (DE); Xavier Hildenbrand, Munich (DE)

(73) Assignee: tyromotion GmbH, Graz (AT)

( * ) Notice: Subject to any disclaimer, the term of this patent is extended or adjusted under 35 U.S.C. 154(b) by 1082 days.

(21) Appl. No.: 17/774,059

(22) PCT Filed: Nov. 4, 2020

(86) PCT No.: PCT/DE2020/100943
     § 371 (c)(1),
     (2) Date: May 3, 2022

(87) PCT Pub. No.: WO2021/089087
     PCT Pub. Date: May 14, 2021

(65) Prior Publication Data
     US 2022/0362930 A1      Nov. 17, 2022

(30) Foreign Application Priority Data

Nov. 4, 2019    (DE) ..................... 10 2019 129 704.4
Jan. 30, 2020   (DE) ..................... 10 2020 102 351.0

(51) Int. Cl.
     B25J 9/16            (2006.01)

(52) U.S. Cl.
     CPC .................................. B25J 9/1615 (2013.01)

(58) Field of Classification Search
     CPC ..................................................... Y10S 700/00
     See application file for complete search history.

(56) References Cited

U.S. PATENT DOCUMENTS 10,893,997 B2    1/2021   Koenig et al.
2012/0130538 A1  5/2012   Riener et al.
                 (Continued)

FOREIGN PATENT DOCUMENTS

BR    102014015776 B1  *  4/2022  ............... A61H 1/02
CN        109589496 A  *  4/2019  ........... A61B 5/1118
                 (Continued)

OTHER PUBLICATIONS

Shahriari et al, "Energy-based Adaptive Control and Learning for Patient-Aware Rehabilitation", 2019 IEEE/RSJ International Conference on Intelligent Robots and Systems (IROS), IEEE,Nov. 3, 2019 (Nov. 3, 2019), pp. 5671-5678, XP033695826.
                 (Continued)

*Primary Examiner* — Suresh Suryawanshi
(74) *Attorney, Agent, or Firm* — Laurence. A. Greenberg; Werner H. Stemer; Ralph E. Locher

(57)                ABSTRACT

A method for open-loop and closed-loop control of a device having a movement module, in terms of its interaction with a human, is based on an energy-based control process that makes it possible to monitor the amount of an overall energy in the system including the device and the human in dependence on a measured control variable describing the speed at which the device or its movement module moves. The method considers the entire power cycle, in particular the dynamics of the energy or power flow, in the system including the device and the human and takes into account the performance of the human during the closed-loop con-
                 (Continued)

trol. The method also enables the participation state of the human who is using the device to be determined in an iterative learning process without additional sensors. A device for carrying out the method is also provided.

15 Claims, 5 Drawing Sheets

(56)                        References Cited

U.S. PATENT DOCUMENTS

| | | | | |
|---|---|---|---|---|
| 2012/0190502 A1 * | 7/2012 | Paulus | ............... | A63B 24/0062 |
| | | | | 482/5 |
| 2015/0066171 A1 * | 3/2015 | Brussog | ................. | H04L 67/04 |
| | | | | 700/91 |
| 2018/0318648 A1 * | 11/2018 | Rai | ......................... | G16H 40/63 |
| 2021/0251838 A1 * | 8/2021 | Ortlieb | ..................... | A61H 3/00 |

FOREIGN PATENT DOCUMENTS

| | | | | | | |
|---|---|---|---|---|---|---|
| CN | 110170104 A | * | 8/2019 | | ......... | A61N 1/36003 |
| CN | 109223444 B | * | 3/2021 | | ............... | B25J 9/00 |
| DE | 102015117596 B3 | | 8/2016 | | | |
| WO | WO-2016134931 A1 | * | 9/2016 | | ........... | B25J 9/1633 |
| WO | WO-2017050961 A1 | * | 3/2017 | | ........... | B25J 9/1615 |

OTHER PUBLICATIONS

Asl et al, "An Assistive Control Strategy for Rehabilitation Robots Using Velocity Field and Force Field", 2019 IEEE 16th International Conference on Rehabilitation Robotics (ICORR), IEEE,Jun. 24, 2019 (Jun. 24, 2019), pp. 790-795, XP033583300.

Moro et al, "A Passivity-based Concurrent Whole-Body Control (cWBC) of Persistently Interacting Human-Exoskeleton Systems", arxiv.org, Cornell University Library, 201 Olin Library Cornell University Ithaca, NY 14853,Aug. 9, 2017 (Aug. 9, 2017), XP080952131.

Groothuis, et al.: Initial control paradigms implemented on rehabilitation system, published May 23, 2018, URL: https://ec.europa. eu/research/participants/documents/downloadPublic?documentIds= 080166e5b916f0de&appId=PPGMS.

Schindlbeck, et al.: Unified passivity-based Cartesian force/ impedance control for rigid and flexible joint robots via task-energy tanks, 2015 IEEE International Conference on Robotics and Automation (ICRA), Seattle, WA, 2015, pp. 440-447 (doi: 10.1109/ ICRA.2015.7139036).

Shariari, et al.: Valve-based Virtual Energy Tanks: A Framework to Simultaneously Passify Controls and Embed Control Objectives, 2018 Annual American Control Conference (ACC), Mil-waukee, WI, 2018, pp. 3634-3641 (doi: 10.23919/ACC.2018.8431718).

Shariari, et al.: "Adapting to Contacts: Energy Tanks and Task Energy for Passivity-Based Dynamic Movement Primitives", 2017 IEEE-RAS 17th International Conference on Humanoid Robotics (Humanoids),Birmingham, UK, Nov. 15-17, 2017, pp. 136-142.

* cited by examiner

METHOD FOR THE OPEN-LOOP AND CLOSED-LOOP CONTROL OF A DEVICE INCLUDING A MOVEMENT MODULE DURING THE INTERACTION OF THE DEVICE WITH A HUMAN, AND DEVICE CONTROLLED IN SUCH A MANNER

FIELD AND BACKGROUND OF THE INVENTION

The present invention relates to a method for open-loop and closed-loop control of a device, comprising a movement module, in terms of its interaction with a human.

As robotic systems find use in ever more areas of human life, there is an equivalent increase in the quality standards expected in relation to the open-loop and closed-loop control thereof in respect of their interaction with the human. In this context safety aspects play a decisive role, especially in medical engineering: The intention is for rehabilitation robots to adopt therapy tasks, for example within the scope of movement therapy and/or early rehabilitation, and as a result firstly relieve medical-physiotherapeutic staff from routine tasks and secondly facilitate an early movement therapy for the patient, which is individually adapted to them and temporally independent. However, the interaction between robotic system and human (patient) places particularly high demands on the technical control systems since a human, especially a physically impaired, possibly bedridden and/or even unconscious patient, acts on the robotic system often in uncontrolled or unpredictable fashion. A decisive control object therefore consists in making the closed-loop and open-loop control algorithms tolerant to unpredictable external influences (by the patient/human) and at the same time providing the human with a type of leeway for the interaction.

Moreover, statements about the state of health or the rehabilitation progress of a patient can be made precisely by way of an evaluation of the interaction between a human and a rehabilitation robot.

The therapeutic success of a robot-assisted movement therapy depends to a great extent on the "active" participation of the patient, with "active" in this context being intended to be understood as both a conscious muscle movement (active movement, or jumpy jerks) and (e.g., in the case of unconscious patients) an unconscious muscle contraction/relaxation (e.g., a spasticity) during a robot-assisted movement.

Early robotic systems from medical engineering usually used purely position-controlled control systems, in which a movement trajectory specified by the robot had to be strictly observed and the patient did not have any possibility of influencing the desired movement pattern with their motoric capabilities (still) present. Such purely passive, robot-assisted movement therapy concepts led to comparatively little therapy success.

To increase patient participation in movement therapy, so-called "assist-as-needed" control systems were subsequently developed; these allow the patient to influence the movement trajectory guided by the robotic system up to a certain extent, the robot monitoring the movement and optionally carrying out corrections or providing assistance in time and space. It was possible to show that such "assist-as-needed" systems are able to increase the therapy success; however, such an approach places particularly high demands on the respective control system, especially also within the scope of a very early mobilization (VEM) of for example patients within a few hours or days following the event (accident, cerebrovascular accident, operation or the like), since such patients may typically still be unconscious or sedated, may suffer from perception disorders, dizziness and/or seizures, or may suffer from disturbances when controlling the movement apparatus, greatly increasing the probability of uncontrolled or incompletely controlled movements. Force-controlled/dependent control systems which react to the action of a (suddenly occurring) external disturbance (=force effect or deviation from a desired trajectory) by a deactivation of the robotic system and which find use in other fields of application often disadvantageously lead to therapy delays and a reduction in the therapy quality in the case of medical engineering applications since safety reasons either dictate the provision of particularly sensitive, patient non-specific force thresholds (trigger) in order to minimize the risk of injury, which disadvantageously may lead to numerous false deactivations (too early deactivations), or, if individual thresholds are set, make it necessary to initially determine these in time-consuming fashion and then adjust these over the course of the movement therapy to the changing physical state of the patient.

Examples of long-established approaches for appropriate open-loop and closed-loop control methods are found, inter alia, in:

GROOTHUIS, S. S., HAARMAN, C. J. W, TÖNIS, F., STRAMIGIOLI, S.: Initial control paradigms implemented on rehabilitation system, published May 23, 2018, URL: https://ec.europa.eu/research/participants/documents/downloadPublic?documentIds=080166e5b916f0de&appId=PPGMS SCHINDELBECK, C., HADDADIN, S.: Unified passivity-based Cartesian force/impedance control for rigid and flexible joint robots via task-energy tanks, 2015 IEEE International Conference on Robotics and Automation (ICRA), Seattle, WA, 2015, pp. 440-447 (doi: 10.1109/ICRA.2015.7139036)

SHARIARI, E.; JOHANNESMEIER, L., HADDADIN, S.: Valve-based Virtual Energy Tanks: A Framework to Simultaneously Passify Controls and Embed Control Objectives, 2018 Annual American Control Conference (ACC), Milwaukee, WI, 2018, pp. 3634-3641 (doi: 10.23919/ACC.2018.8431718)

SUMMARY OF THE INVENTION

Proceeding therefrom, the present invention is based on the object of providing a method for open-loop and closed-loop control of a device comprising a movement module, in particular of a rehabilitation robot, which is improved over the prior art and which not only improves the interaction of the device with a human but also offers the option of drawing conclusions about the participation of the human in relation to the desired movement on the basis of said interaction and of then controlling the device in accordance with this participation.

This object is achieved by a method having the features described below. Further advantageous configurations and developments, which are able to be used individually or in combination with one another, are the subject matter of the dependent claims.

The method according to the invention for open-loop and closed-loop control of a device, at least comprising a movement module, in terms of its interaction with a human, is distinguished in that an energy network is defined, the latter at least consisting of:

a first power component $P_{in}$ which describes the amount of energy per unit time supplied by the device to an overall energy S of a system of device and human;

a second power component $P_{diss}$ which describes the amount of energy per unit time lost by the device by way of internal open-loop and closed-loop control processes outside of the work to be carried out primarily with the aid of the movement module; and a third power component $P_h$ which describes the amount of energy per unit time supplied by the human to the overall energy S;

the overall energy S of the energy network, that is to say of the system of device and human, is defined as a controlled variable;

the speed with which the device interacts with the human by way of a movement module is defined as a control variable $\Omega$, the movement module being intended to traverse a desired trajectory $x_d$;

the overall energy S of the energy network increases the more the movement independently carried out by the human deviates from the movement along the trajectory $x_d$ initially specified by the device; and decreases again if the movement independently carried out by the human approaches the movement along the trajectory $x_d$ initially specified by the device;

the overall energy S of the energy network is determined during the movement of the movement module, and the control variable $\Omega$ is varied during the movement of the movement module depending on the determined overall energy S such that the overall energy S remains in an interval of $S \leq S_{max} - S_\Delta$ if located in said interval or approaches the interval $S \leq S_{max} - S_\Delta$ again if located in an interval of $S > S_{max} - S_\Delta$, where $S_{max}$=a chosen upper boundary of the overall energy S;

$S_\Delta = S_{max} - S_{x1}$, where $S_{x1}$ represent individual values of the controlled variable (=overall energy) S and x=n is used to designate values in an interval with $P_{in} > 0$ and x=p is used to designate values in an interval with $P_{in} < 0$.

The method according to the invention defines an energy network, as a result of which it is possible to consider the entire power cycle, in particular the dynamics of the energy or power flow, in the device/human system and advantageously take into account the performance of the human during the control. This energy-based control method based on controlling/restricting the overall energy S which describes both energy contributions of the device and energy contributions of the human advantageously provides the human using the device with both spatial and temporal degrees of freedom while carrying out the movement, depending on participation state, and consequently promotes the training or rehabilitation progress.

Qualitatively, the method according to the invention can be sketched out as follows using the example of a rehabilitation mechanism (=device (robot) suitably designed to carry out a rehabilitation movement according to plan in the field of medicine):

A healthy human can follow a movement specified by a rehabilitation mechanism—expressed by a desired trajectory of a movement module of the rehabilitation mechanism—that is to say the human can for example go along with the speed of the movement of the movement module so exactly that the interaction force between human and device is negligibly small.

A human with impaired health is normally no longer able to follow the described desired movement of the movement module with the same level of accuracy. An error arises, specifically a deviation between the desired trajectory and the actual trajectory traversed by the movement module, in particular the end effector of the device.

In general, three different types of trajectories are distinguished within the scope of this application:

A "nominal trajectory" is understood to mean a sequence of movements (desirable from a therapeutic point of view) specified by a therapist. If a movement is in fact carried out along this nominal trajectory, the control variable $\Omega$ has a value of 1.

A "trajectory specified by the device (the movement module)=desired trajectory" is understood to mean the movement trajectory or sequence of movements of the movement module, in particular of its end effector, which the movement module attempts to follow in accordance with the control algorithm specified thereto. The need to follow such a trajectory arises, for example, if the control variable is $\Omega \neq 1$.

An "actual trajectory" is understood to mean the actually physically realized movement trajectory of the movement module, in particular of its end effector. The actual trajectory may deviate from the desired trajectory, for example because the impedance control of the device is set to be soft and allows the human (patient) to deflect the end effector of the device by exerting a force thereon. A similar statement also applies when implementing an admittance control instead of an impedance control (see below).

The aforementioned error which may arise during the movement of a human with impaired health is expressed by a deviation of the actual trajectory from the desired trajectory.

Within the scope of the open-loop and closed-loop control method according to the invention, this error is reflected in a controlled variable, specifically in the overall energy S of the energy network, that is to say of the system of device and human. In this case, the overall energy S is a function of the three power components $P_{in}$, $P_h$ and $P_{diss}$ defined above.

While an automated therapy movement is carried out with the aid of a device according to the invention, this controlled variable—the overall energy S—is now intended to stay in a certain, "preferred" interval, specifically in an interval $S \leq S_{max} - S_\Delta$.

In this case, the variable S can be influenced or is influenced by the device by way of its power component $P_{in}$ and by the human by way of their performance $P_h$. Mathematically, this can be expressed in Equation 20 (see below), which describes the change in the overall energy S over time.

Furthermore, two cases are now distinguished within the scope of the open-loop and closed-loop control method:

Firstly the case where the overall energy S is already in the preferred interval $S \leq S_{max} - S_\Delta$. In this case, the human manages to go along with the desired trajectory, maybe not perfectly but nevertheless to the greatest possible extent; by way of example, the human can virtually hold the desired movement speed. In this case, the device makes no further intervention in the movement, and the control variable remains at $\Omega = 1$.

In the interval S $S_{max} - S_\Delta$ to which this applies, the sensitivity of the control variable $\Omega$ dependent on the overall energy S is as it were equal to zero (or approximately zero);

the control variable $\Omega$ is not altered; the deviation from the desired trajectory is tolerated. This interval can be controlled by way of a suitable choice of the variables $S_{max}$ and $S_\Delta$.

In the second case, S is outside of the preferred interval, that is to say $S > S_{max} - S_\Delta$. In this case, there is a significant deviation between the actual trajectory and the desired trajectory; for example, this may be caused by the human moving (much) too slow or (much) too fast in comparison with the movement specified by the movement module.

The goal within the scope of the method according to the invention in this case lies in reducing the overall energy S, that is to say bringing the variable S back into the preferred interval $S \leq S_{max} - S_\Delta$.

Once again, there are two options for realizing this:

Either the human manages a reduction in the variable S on their own, specifically by virtue of taking countermeasures themselves and performing their movement correspondingly faster or slower and in this way approaching the desired trajectory again. In such a case, the power component $P_h$ would be negative which, according to Equation 20, would lead to a reduction in the overall energy S if the absolute value of $P_h$ is large enough.

In general, the power component $P_h$ describes the physical force "generated" by the human. It is zero if the human perfectly follows the desired trajectory, that is to say if the actual trajectory equals the desired trajectory. $P_h$ is negative if the human themselves makes an attempt to approach the desired trajectory because errors in position and speed are reduced in the process and hence the overall energy S is reduced.

Or—as the second option—the human does not manage said reduction themselves, or at least does not manage said reduction in full. In this case, the device assists the human with the reduction in the overall energy S by way of altering the power component $P_{in}$. The power component $P_{in}$ describes the power at the respective desired end effector position within a desired trajectory.

According to Equations 13 and 23, the power component $P_{in}$ can be influenced by way of the control variable $\Omega$. A variation in the control variable $\Omega$ now sets in here within the scope of the closed-loop and open-loop control method according to the invention, this reducing the overall energy S by way of a change in $P_{in}$ and allowing said overall energy to approach the preferred interval $S \leq S_{max} - S_\Delta$ again.

In a preferred configuration of the method, the device is a rehabilitation mechanism suitably designed for a rehabilitation of at least the joints, muscles and tendons of the lower extremities of a human according to plan, using a movement module that is able to be brought into an operative connection with the lower extremities of the human; the movement module comprising at least one force sensor for measuring an absolute value of a force between the movement module and the lower extremity of the human, and at least one angle sensor for measuring the direction of the force between the movement module and the lower extremity of the human. The method is particularly well-suited for the open-loop and closed-loop control of such a rehabilitation mechanism since it advantageously facilitates a continuous adjustment to the current health or fitness state of the human and optimizes the rehabilitation success as a result.

Furthermore, it has proven its worth for the control variable Q to be defined as $$
\Omega = \begin{cases}
\gamma_p & \text{if } S_{max} \leq S \wedge P_{in} < 0 \\
1 + \dfrac{\gamma_p - 1}{2}\left[1 + \cos\left(\dfrac{S_{max} - S}{S_\Delta}\pi\right)\right] & \text{if } S_{max} - S_\Delta < S < S_{max} \wedge P_{in} < 0 \\
1 & \text{if } S \leq S_{max} - S_\Delta \\
1 - \dfrac{\gamma_n + 1}{2}\left[1 + \cos\left(\dfrac{S_{max} - S}{S_\Delta}\pi\right)\right] & \text{if } S_{max} - S_\Delta < S < S_{max} \wedge P_{in} > 0 \\
-\gamma_n & \text{if } S_{max} \leq S \wedge P_{in} > 0
\end{cases}
$$

where:

$\gamma_p$=maximum permitted positive value for the control variable $\Omega$;

$\gamma_n$=maximum permitted negative value (absolute value) for the control variable $\Omega$;

S=overall energy of the system of device and human;

$S_{max}$=chosen upper boundary of the overall energy S;

$S\Delta = S_{max} - S_{p\_x}$, where $S_{p\_x}$ represent individual values of the controlled variable S.

By means of a thus defined control variable $\Omega$, which describes the movement speed of the device, especially of the movement module, it is advantageously possible to track the movement participation of the human and "form" the overall storage function (S), that is to say the overall energy of the system, according to plan.

Alternatively, the control variable (Q) may also be defined as $$
\Omega = \begin{cases}
\gamma_p & \text{if } S_{max} \leq S \wedge P_{in} < 0 \\
1 + \dfrac{\gamma_p - 1}{2}\left[1 + \cos\left(\dfrac{S_{max} - S}{S_\Delta}\pi\right)\right] & \text{if } S_{max} - S_\Delta < S < S_{max} \wedge P_{in} < 0 \\
1 & \text{if } S \leq S_{max} - S_\Delta \\
1 - \dfrac{1}{2}\left[1 + \cos\left(\dfrac{S_{max} - S_\Delta + \dfrac{S_\Delta - S_\delta}{2} - S}{\dfrac{S_\Delta - S_\delta}{2}}\pi\right)\right] & \text{if } S_{max} - S_\Delta < S < S_{max} - S_\Delta + \dfrac{S_\Delta - S_\delta}{2} \quad \wedge P_{in} > 0 \\
0 & \text{if } S_{max} - S_\Delta + \dfrac{S_\Delta - S_\delta}{2} < S < S_{max} - \dfrac{S_\Delta - S_\delta}{2} \wedge P_{in} > 0 \\
1 - \dfrac{1}{2}\left[1 + \cos\left(\dfrac{S_{max} - S}{\dfrac{S_\Delta - S_\delta}{2}}\pi\right)\right] & \text{if } S_{max} - \dfrac{S_\Delta - S_\delta}{2} < S < S_{max} \quad \wedge P_{in} > 0 \\
-\gamma_n & \text{if } S_{max} \leq S \wedge P_{in} > 0
\end{cases}
$$

where:

$\gamma_p$=maximum permitted positive value for the control variable ($\Omega$);

$\gamma_n$=maximum permitted negative value (absolute value) for the control variable ($\Omega$);

S=overall energy of the system of device and human;

$S_{max}$=chosen upper boundary of the overall energy (S);

$S\Delta=S_{max}-S_{p\_x}$, where $S_{p\_x}$ represent individual values of the controlled variable S;

$S\delta$=region in the middle of $S\Delta$ for which the control variable ($\Omega$) is set equal to zero, where $P_{in}$>0.

Such a definition of the control variable ($\Omega$) advantageously allows a mutually independent open-loop and closed-loop control of a device for the interval in which the first power component ($P_{in}$), that is to say the power input into the system generated by a movement generator, is greater than zero ($P_{in}$>0) and for the interval in which the first power component ($P_{in}$) is less than zero ($P_{in}$<0).

In a further alternative configuration of the method according to the invention, the control variable ($\Omega$) can be defined as $\Omega =$ $$\begin{cases} \gamma_p & \text{if } S_{max} \cdot \zeta \le S\Lambda P_{in} < 0 \\ 1 + \dfrac{\gamma_p - 1}{2}\left[1 + \cos\left(\dfrac{S_{max} \cdot \zeta - S}{S_\Delta}\pi\right)\right] & \text{if } S_{max} \cdot \zeta - S_\Delta < S < S_{max} \cdot \zeta\Lambda P_{in} < 0 \\ 1 & \text{if } S \le S_{max} \cdot \zeta - S_\Delta \\ 1 - \dfrac{\gamma_n + 1}{2}\left[1 + \cos\left(\dfrac{S_{max} \cdot \zeta - S}{S_\Delta}\pi\right)\right] & \text{if } S_{max} \cdot \zeta - S_\Delta < S < S_{max} \cdot \zeta\Lambda P_{in} > 0 \\ -\gamma_n & \text{if } S_{max} \cdot \zeta \le S\Lambda P_{in} > 0 \end{cases}$$

where:

$\gamma_p$=maximum permitted positive value for the control variable ($\Omega$);

$\gamma_n$=maximum permitted negative value (absolute value) for the control variable ($\Omega$);

S=overall energy of the system of device (1) and human (M);

$S_{max}$=chosen upper boundary of the overall energy (S);

$S\Delta=S_{max}\cdot\zeta-S_{p\_x}$, where $S_{p\_x}$ represent individual values of the controlled variable S;

$$\zeta = \begin{cases} 1 & \text{if } \hat{t} < \tau \\ e^{\hat{t}-\tau} & \text{for all other values of } \hat{t} \end{cases}$$

where $\hat{t}$=time during which the device (1) is at a standstill $\tau$=maximum time the device (1) is permitted to be at a standstill This definition of the control variable $\Omega$ advantageously considers periods of time in which the patient cannot (immediately) follow the movement cycle specified by the device. In this case, the introduction of the parameter $\zeta$ provides for the option of an intermittent standstill of or waiting state for the device.

In a preferred configuration of the method, the variation of the control variable $\Omega$ can be damped during the movement of the movement module on the basis of the determined overall energy S, especially by implementing a filter, a rate restriction and/or a limitation of an absolute value of the first derivative of the control variable $\Omega$ with respect to the overall energy S. Vibrations that are perceived as bothersome, which may arise when varying the control variable $\Omega$ in the system as a result of feedback to the overall energy S, can advantageously be minimized as a result. Such vibrations may arise especially if the dependence of the control variable $\Omega$ on the overall energy S, which may also be referred to as overall storage function S, has a high sensitivity.

In a further configuration, the overall energy (S) of the system of device and human is preferably defined as an overall storage function $S=S_{ce}$ or as an overall storage function $S=S_{ce}+S_{ee}$, where:

$S_{ce}$=control error energy storage function;

$S_{ee}$=overall energy of the end effector of the device, especially of the movement module, consisting of kinetic and potential energy.

In this case, it is advantageous if the control error energy storage function is defined as $$S_{ce} = \frac{1}{2}\dot{\tilde{x}}^T M_C(q)\dot{\tilde{x}} + \frac{1}{2}\tilde{x}^T K_x \tilde{x}$$

where:

$M_C(q)$ is the Cartesian moment of inertia matrix; and $K_x$ is the Cartesian stiffness matrix.

Moreover, it was found to be advantageous for the overall energy (S) to comprise a virtual absolute energy value and an actual absolute energy value.

Such a control error energy storage function $S_{ce}$ advantageously considers all device-related energy contributions in the present system.

In this case, it is advantageous if the energy storage function $S_{ce}$ is determined either by way of the first power component $P_{in}$, with the first power component $P_{in}$ being combined by calculation with the second power component $P_{diss}$; or is calculated by way of an interaction force between device and human, especially measured by a force sensor for measuring an absolute value of a force between the movement module and the lower extremity of the human.

To determine the energy storage function $S_{ce}$, it would be possible in principle to consider the energy introduced by the device and combine this by calculation with the energy "consumed" by the mechanical structure of the device. However, this would require good models of the respective device.

A simpler way for determining the energy storage function $S_{ce}$ is implemented via the determination of the interaction force between device and human, in particular the interaction force at the end effector of the device. Firstly, this interaction force can be calculated using a kinetic model of the device and the axial torques. Alternatively, said interaction force may also be determined by measurement. To this end, advantageous use can be made of the force sensor for measuring an absolute value of a force between the movement module and the lower extremity of the human.

Using the measured interaction force, it is then firstly possible to directly calculate the energy storage function $S_{ce}$; secondly, the values measured by the force sensor can also be used to determine deviations in the position adopted by the end effector of the device from its ideal position as a result of the application of the interaction force (within the meaning of an admittance control—cf. above).

The model of the device used to this end describes the behavior of the end effector as a virtual spring-damper system with given stiffness and damping, the end effector being deflected from its desired trajectory in accordance with the virtual spring constant as a result of applying an external force to the force sensor. Then, the energy storage function $S_{ce}$ can be calculated from the deviation from the desired trajectory.

The time derivative of the overall storage function S therefore advantageously arises as $P_{in}+P_h-P_{diss}$, where:

$P_{in} \in R$=the power input into the system generated by the movement generator;

$P_{diss} \in R$=the power lost by control damping;

$P_h$=the power supplied to the system of device and human by the human, as a result of which the performance of the human within the scope of the control method can advantageously be taken into account.

In a preferred configuration of the method, it has moreover proven its worth to determine a limit ($S_{max}$) to be chosen for carrying out a movement by way of an iterative learning process by the device while the movement is carried out, said limit being for the overall storage function corresponding to the overall energy (S) and/or the variable $SΔ=S_{max}-S_{p\_x}$, where $S_{p\_x}$ are individual values of the overall energy (S). Preferably, it is not only the limit $S_{max}$ that is adjusted from step to step during this iterative learning process but also the interval boundaries of the function $Ω(S)$, in particular in accordance with the variable $SΔ=S_{max}-S_{p\_x}$, where $S_{p\_x}$ are individual values of the overall energy (S).

Moreover, preferably, a learning factor $κ_l$ and/or a forgetting factor $κ_f$ for determining a participation state of the human in the movement specified by the device may be changed over time, preferably changed linearly over time, within the scope of the iterative learning process until the learning factor $κ_l$ and/or the forgetting factor $κ_f$ has reached a final value defined in advance. The learning factor $κ_l$ and/or the forgetting factor $κ_f$ can advantageously be dynamically adapted to the fitness state of the human during a movement therapy, in particular to the current state of tiring of a patient during a therapy session, as a result.

Advantageously, a value for the limit ($S_{max}$) can be chosen in a first iteration step in this case, in the case of which value device can initially run through n movement cycles without a given limit ($S_{max}$), the number n of movement cycles being in the interval of $2 \leq n \leq 5$ movement cycles, preferably being 3 movement cycles. An $S(ϕ)$ profile can be recorded in the process and a mean value of the recorded $S(ϕ)$ values can subsequently be calculated as initial limit ($S_{init}(ϕ)$), which can serve as a start value for the limit ($S_{max}$) in a first iteration step of the iterative learning process in the form $λ \cdot S_{init}(ϕ)$ with $λ \geq 1$. The learning factor ($κ_l$) and/or the forgetting factor ($κ_f$) for determining a participation state of the human in the movement specified by the device can also be scaled on the basis of the initial limit ($S_{init}(ϕ)$) within the scope of this initialization. An initialization can advantageously increase the patient specificity of the method according to the invention.

In this case, a limit ($S_{max}$) to be chosen for carrying out a movement, said limit being for the overall storage function corresponding to the overall energy (S), can be split into regions ($Ψ_i(ϕ)$) on the basis of a phase value ($ϕ$)) that describes the movement progress within a movement cycle of the device and an initial limit ($S_{init,\ i}(ϕ)$) can be determined for each region ($Ψ_i(ϕ)$).

By determining an initial limit ($S_{init}(ϕ)$) in this way, especially also for individual regions determined in phase-dependent fashion ($ψ_i(ϕ)$), it is advantageously possible, for different patients with different clinical pictures, to individually automatically determine the start value for the limit ($S_{max}$) for the overall storage function corresponding to the overall energy (S) prior to the start of a movement therapy.

Finally, a configuration of the method according to the invention has also proven its worth, in which a limit ($S_{max}$) to be chosen for carrying out a movement, said limit being for the overall storage function corresponding to the overall energy (S), is split into regions ($ϕ_i(ϕ)$) on the basis of a phase value ($ϕ$) that describes the movement progress within a movement cycle of the device, a region ($ϕ_i(ϕ)$) describing the phase value interval from $ϕ_{str,\ i}$ to $ϕ_{str,\ i+1}$, and the limit ($S_{max}(ϕ)$) to be chosen is defined independently for each region ($ϕ_i(ϕ)$), with the following applying to all phase values ($ϕ$) of a region ($ϕ_i(ϕ)$):

$$S_{max}(ϕ) = \begin{cases} \dfrac{\overline{S}_{max,i}+\overline{S}_{max,i-1}}{2} + \dfrac{\overline{S}_{max,i}-\overline{S}_{max,i-1}}{2}\sin\left(π\dfrac{ϕ-ϕ_{str,i}}{2Δ}\right) & \text{if } ϕ < ϕ_{str,i}+Δ \\[2ex] \dfrac{\overline{S}_{max,i}+\overline{S}_{max,i-1}}{2} + \dfrac{\overline{S}_{max,i}-\overline{S}_{max,i+1}}{2}\sin\left(π\dfrac{ϕ_{str,i+1}-ϕ}{2Δ}\right) & \text{if } ϕ > ϕ_{str,i+1}-Δ \\[2ex] \overline{S}_{max,i} & \text{for all other values of } ϕ \end{cases}$$

the device fully assists the human with carrying out the movement and the control variable ($Ω$) has the value of 1; the value of the limit ($S_{max}$) is reduced in each further iteration step for as long as the control variable ($Ω$) maintains the value of 1; and should the control variable ($Ω$) deviate from the value of 1, the value of the limit ($S_{max}$) is increased again in a next iteration step. Such an iterative learning process for determining an optimal limit ($S_{max}$) advantageously allows the participation capability of the human to be determined without the use of additional sensors, as would be required within the scope of electromyography (EMG) for example. Advantageously, the current health or fitness state of the human, and hence also the rehabilitation success, can also be deduced from the participation capability determined thus.

To determine an initial limit ($S_{init}(ϕ)$) in a further configuration of the method according to the invention, the where $Δ \geq 0$ describes a smoothing interval which comprises a smaller value range of phase values ($ϕ$) than the regions ($ϕ_i(ϕ)$), especially a tenth of the phase values ($ϕ$) of the corresponding region ($ϕ_i(ϕ)$); and $\overline{S}_{max,i}$ is the limit associated with the respective region ($ϕ_i(ϕ)$).

In this way, a therapist can advantageously define different zones for activating disparate muscle groups and, in accordance with these zones, determine the assistance effect by the device and the scope of the adaptation of the device within these zones. The extent of the assistance effect can be described by a smooth function here, advantageously preventing interruptions or disturbances in the sequence of movements.

The present invention also relates to a device comprising a rehabilitation mechanism suitably designed for a rehabilitation of at least the joints, muscles and tendons of the lower extremities of a human according to plan, using a movement module that is able to be brought into an operative connection with the lower extremities of the human; the movement module comprising at least one force sensor for measuring an absolute value of a force between the movement module and the lower extremity of the human, and at least one angle sensor for measuring the direction of the force between the movement module and the lower extremity of the human, which device is distinguished in that it comprises a control unit which is configured for open-loop and closed-loop control of the device according to a method of the invention.

Additional details and further advantages of the invention are described below on the basis of preferred exemplary embodiments, which however do not restrict the present invention, and in conjunction with the attached drawing,

DETAILED DESCRIPTION OF THE INVENTION

In the following description of preferred embodiments of the present invention, the same reference signs denote the same or comparable components.

The method according to the invention for open-loop and closed-loop control of a device 1, at least comprising a movement module 50, in terms of its interaction with a human M, is not device-specific as a matter of principle and can find use in the open-loop and closed-loop control of a multiplicity of devices 1, especially robotic systems. However, the use of the method is particularly preferred for open-loop and closed-loop control of robotic systems which are used to provide medical engineering-based assistance in the rehabilitation of patients, in particular following a cerebrovascular accident or a severe accident which has impaired physical and/or cognitive abilities. In this respect, exemplary reference is made to a rehabilitation mechanism as disclosed in DE 10 2015 117 596 B3 by one of the applicants.

To explain the method according to the invention, a robotic rehabilitation system consisting of a bed that can be driven into the vertical and two robotic arms for interaction with the legs of a human M is considered below as a model system or device 1 (also cf. FIG. 4a and FIG. 4b in this respect).

Figure 4A:
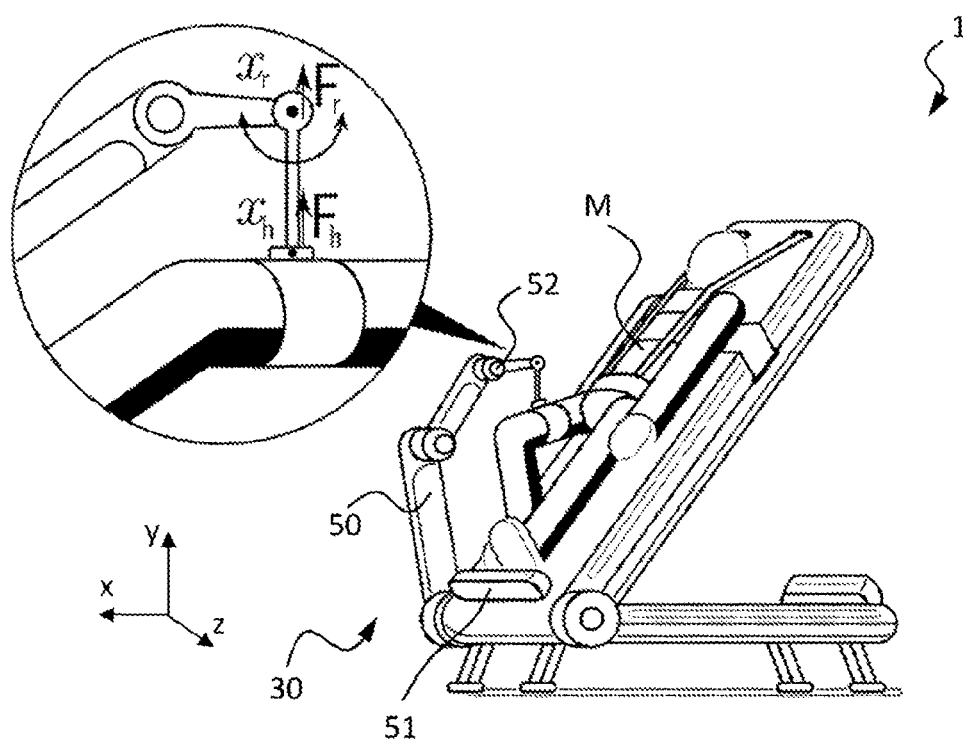
FIG. 4a shows a first embodiment of a device which can be controlled using the method according to the invention.
Figure 4B:
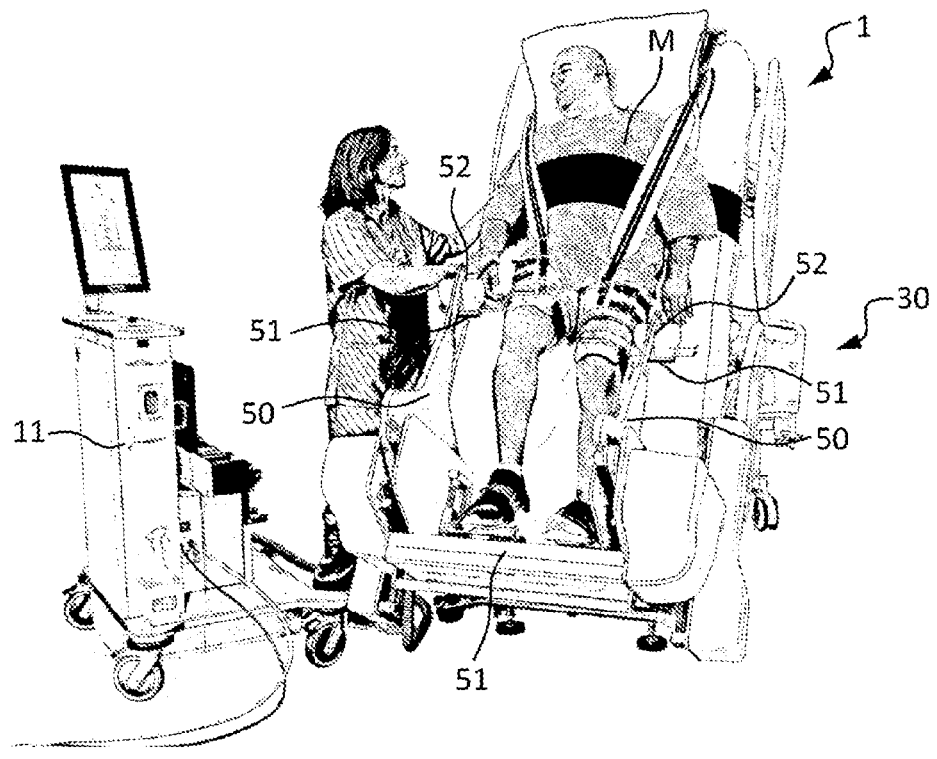
FIG. 4b shows a second embodiment of a device which can be controlled using the method according to the invention.

A first and a second embodiment of a device 1 which can be controlled by the method according to the invention are shown in FIGS. 4a and 4b.

Such a device 1 preferably comprises a rehabilitation mechanism 30 suitably designed for a rehabilitation of at least the joints, muscles and tendons of the lower extremities of a human M according to plan, using a movement module 50 that is able to be brought into an operative connection with the lower extremities of the human M; the movement module 50 comprising at least one force sensor 51 for measuring an absolute value of a force between the movement module 50 and the lower extremity of the human M, and at least one angle sensor 52 for measuring the direction of the force between the movement module 50 and the lower extremity of the human M. By means of a control unit 11, there is open-loop or closed-loop control of the device 1 in accordance with the method according to the invention.

Each robotic arm preferably comprises n motor-driven joints and a passive end joint in order to avoid overdetermination and consequently to consider the respective orientation of the thigh or thighs of the human M. The robotic arms are considered identical for the following derivation of the control model and for the explanation of the method according to the invention, and so the explanations can be restricted to one robotic arm, although these equally apply accordingly to the other arm.

I) Model for Describing the Device 1, Especially the Robotic Rehabilitation System Within the scope of considering the kinematic structure of the robotic system, the assumption is made that the end effector and the joints of the robot move only parallel to the xy-plane (cf. FIG. 4a with regard to the definition of the coordinate system), as a result of which their movement in the three-dimensional space ("$R^3$ space") can be described by a position within the xy-plane and an orientation about a z-axis. Moreover, since the last joint of the robotic arm is passive, the Cartesian holding/positioning of the passive joint $x_r \in R^3$ is considered instead of the end effector positioning $x_h \in R^3$ (cf. FIG. 4a) for the purposes of developing the open-loop and closed-loop control method for the robotic system. $F_r$; $F_h \in R^3$ denote the actions of force ("interaction wrenches") at $x_r$ and $x_h$ and in this case relate to linear forces in the xy-plane and a torque about the z-axis.

Taking account of n motor-driven joints of the robot and the orientation $q_b$ of the bed, the coordinates of the robot including the last joint emerge as $q \in R^{n+1}$ and the direct kinematic (forward kinematic) emerges as $$x_r = f(q) \tag{1}$$

where the orientation of the bed $q_b$ is contained in q.

Further, the assumption is made that the orientation of the bed is driven by a separate actuator such that the correspondingly introduced torque is not considered in the dynamic model described here.

The dynamic model is described as follows:

$$\tau_{in} + \tau_r = M(q')\ddot{q}' + C(q', \dot{q}')\dot{q}' + g(q) \tag{2}$$

$$q := [q_b, q']^T \tag{3}$$

with M(q') (=the moment of inertia matrix of the robot), $$C(q', \dot{q}')$$

(=the Coriolis and centrifugal matrix of the robot)$\in R^{n \times n}$ and $g(q) \in R^n$ (=gravitational vector of the robot). $\tau_{in} \in R^n$ is the torque introduced to the robotic actuators, whereas $\tau_r \in$ denotes the action of force ("wrench") $F_r$, mapped on the motor-driven joints of the robot by way of $$\tau_r = J^T(q) F_r \tag{4}$$

$$J(q) = \frac{\partial f(q)}{\partial q'} \tag{5}$$

with $J(q) \in R^{n \times 3}$=Jacobi matrix of the robot.

II) Control Method on the Basis of Energy Considerations

Figure 1:
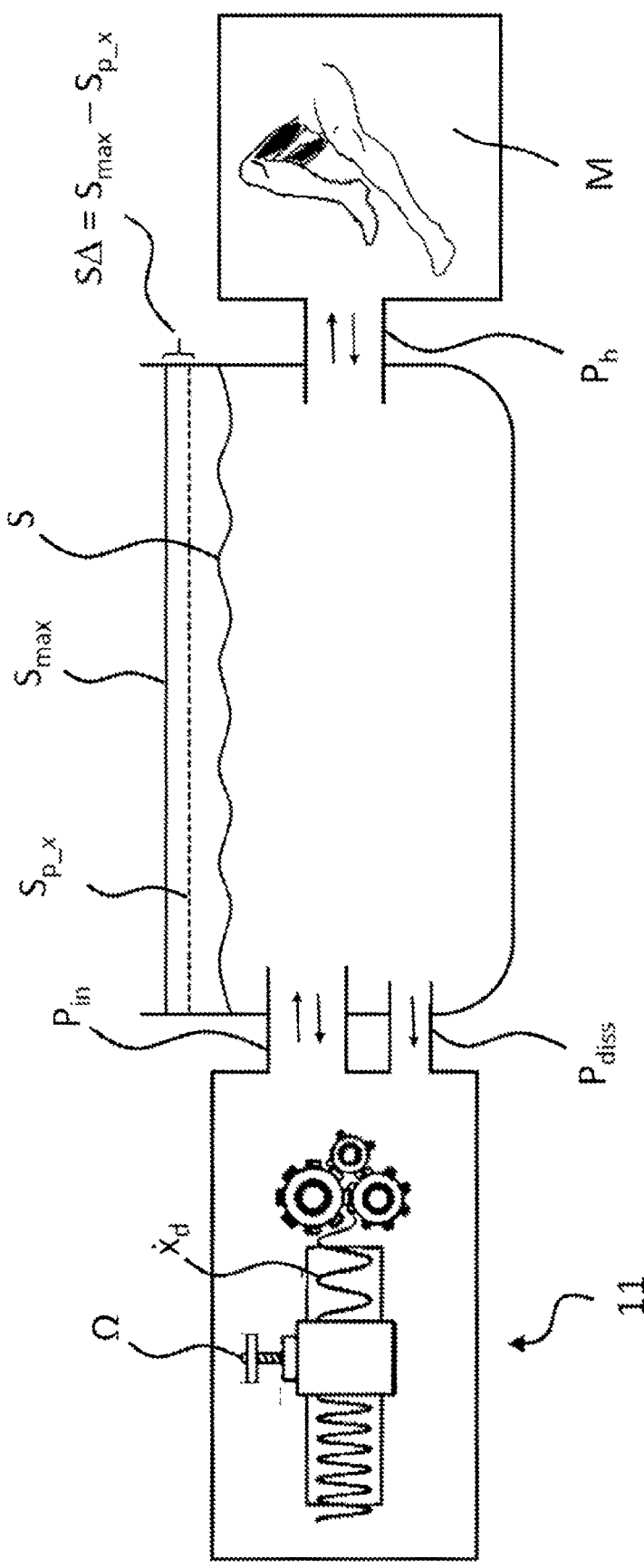
FIG. 1 shows an energy flow scheme of a system of a device and a human, which forms the basis of the method according to the invention.

The control scheme according to the invention is based on adapting the movement to be carried out by the robot ("robot desired motion")

$$\{x_d, \dot{x}_d, \ddot{x}_d\} \in R^3$$

in order to shape the energy flow within the system of device 1 and human M and thereby control the energy transfer between human M and device 1. Taking account of a cyclical trajectory with an assigned movement amplitude, which is specified for a specific rehabilitation movement, the speed with which the trajectory is traversed by the robot is adjusted so that a specified energy limit is also observed. The adjusted trajectory obtained in this way ("re-shaped trajectory") is then transferred as an input to a control unit for controlling the interaction movement in order to obtain an introduced torque ("input torque") for the robot actuators (cf. FIG. 1). FIG. 1 shows an energy flow scheme of a system of a device 1 and a human M, which forms the basis of the method according to the invention.

Below, a law of motion for the control method is now initially set up in exemplary fashion and an energy network for the model is subsequently derived.

a) Controlling the Interaction Movement

The assumption is made that the device 1, especially the robot, is in physical contact with the human M throughout the entire therapy (=carrying out the therapy movement). Therefore, the use of a compliant control method such as Cartesian impedance control, for example, is recommended. If $$\{x_d, \dot{x}_d, \ddot{x}_d\}$$

is accordingly considered as a trajectory of the device 1, especially of the robot, described in Cartesian coordinates, then the following relationships arise:

$$\tau_{in} = J^T(q)(M_C(q)\ddot{x}_d + C_C(q, \dot{q})\dot{x}_d + D_x\dot{\tilde{x}} + K_x\tilde{x}) + g(q) \tag{6}$$

$$\tilde{x} = x_d - x_r \tag{7}$$

with $K_x$ (=Cartesian stiffness matrix); $D_x$ (=Cartesian damping matrix)$\in R^{3 \times 3}$ and $M_C(q)$ (=Cartesian moment of inertia matrix), $C_C(q, \dot{q})$ (=Cartesian Coriolis and centrifugal matrix)$\in R^{3 \times 3}$.

These matrices are defined as:

$$M_C(q) = J^{-1^T}(q) M(q) J^{-1}(q) \tag{8}$$

$$C_C(q, \dot{q}) = (J^{-1^T}(q) C(q, \dot{q}) - M_C(q)' J(q)) J^{-1}(q) \tag{9}$$

b) Description of the Energy Flow in the System

Taking account of Equations (2) and (6), the following arises for the dynamics of the closed-loop control circuit:

$$M_C(q)\ddot{\tilde{x}} + (C_C(q, \dot{q}) + D_x)\dot{\tilde{x}} + K_x\tilde{x} = F_\tau \tag{10}$$

The following control error energy storage function can be defined for such a device 1, especially for such a robot:

$$S_{ce} = \frac{1}{2}\dot{\tilde{x}}^T M_C(q)\dot{\tilde{x}} + \frac{1}{2}\tilde{x}^T K_x\tilde{x} \tag{11}$$

Taking account of Equation (10) and the skew-symmetric properties of $(\dot{M}_C(q; \dot{q}) - 2C_C(q; \dot{q}))$, it is possible to prove the following:

$$\dot{S}_{ce} = \underbrace{-\dot{x}_d^T F_r}_{P_{in}} + \underbrace{\dot{x}_r^T F_r}_{P_r} - \underbrace{\dot{\tilde{x}}^T D_x\dot{\tilde{x}}}_{P_{diss}} \tag{12}$$

where $P_{in} \in R$ describes the power input into the system generated by the movement generator (especially corresponding to a movement module 50 of the device 1), $P_r \in R$ describes the power input into the system generated by the surroundings, and $P_{diss} \in R$ describes the power lost by control damping. These variables are defined as follows:

$$P_{in} := -\dot{x}_d^T F_r \tag{13}$$

$$P_r := \dot{x}_r^T F_r \tag{14}$$

$$P_{diss} := \dot{\tilde{x}}^T D_x\dot{\tilde{x}} \tag{15}$$

What moreover emerges from taking FIG. 4*a* into account is that the energy flow for the end effector of the device 1, especially of the robot, can be described in a similar manner. The overall energy of the end effector comprises kinetic and potential energy, and so $$S_{ee} = \frac{1}{2}\dot{x}_{ee}^T M_{ee}\dot{x}_{ee} + m_{ee}g_0^T x_{ee} \tag{16}$$

where $x_{ee} \in R^3$ describes the coordinates of the center of mass of the respective end effector pose, $g_0 = [0, g_0, 0]^T$ describes the gravitational vector in world coordinates, and $m_{ee} \in R_+$ and $M_{ee} \in R^{3 \times 3}$ describes the mass or moment of inertia matrix of the end effector. The moment of inertia matrix is defined as:

$$M_{ee} = diag(m_{ee}, m_{ee}, I_{zz,ee}) \tag{17}$$

where $I_{zz,ee} \in R_+$ is the last component of the moment of inertia tensor of the end effector.

Taking account of Newton's second law and the sum of the forces acting on the end effector, the following arises:

$$\dot{S}_{ee} = \underbrace{-\dot{x}_r^T F_r}_{-P_r} + \underbrace{\dot{x}_h^T F_{h_c}}_{P_h} \tag{18}$$

Now it is possible to define an overall storage function $S \in R_{>0}$ as:

$$S := S_{ce} + S_{ee} \tag{19}$$

and, by taking account of Equations (12) and (18), the following arises:

$$\dot{S} = P_{in} + P_h - P_{diss} \tag{20}$$

where $P_h$ describes the power supplied to the system of device 1 and human M by the human M, in turn defined as:

$$P_h := \dot{x}_h^T F_h \tag{21}$$

FIG. 1 shows a schematic interpretation of Equation (20), which describes the main features of the open-loop and closed-loop control method according to the invention. The energy stored in the robot controlled by the open-loop and closed-loop control method according to the invention changes over time as a consequence of a combined effect of the power inputs and outputs $P_h$, $P_{in}$ and $P_{diss}$ connected to the patient movement, of the trajectory generator and the control damping. The frequency of the cyclical movement $\Omega$, which corresponds to the speed of the of the device 1, especially of its movement module 50, and consequently also the desired (specified) trajectory $x_d$ are adjusted on the basis of the current level of stored energy S in comparison with a maximum permitted energy $S_{max}$ and a threshold $S_{max} - S\Delta$. This adjustment directly influences the energy input or output of the movement generator to/from the system of device 1 and human M, that is to say the power input $P_{in}$ into the system over time.

c) Energy Limitation

Normally, energy-based control modeling is used to examine the stability of a system by means of a passivity analysis. However, such models have further advantages, specifically for example a description of the energy flow between two independent (partial) systems. This is of particular interest should one of the (partial) systems act unpredictably, as in the case of a human M (in terms of their interaction with a device 1).

A corresponding example is found in SHAHRIARI, E., KRAMBERGER, A.; GAMS, A., UDE, A., HADDADIN, S.: *Adapting to contacts: Energy tanks and task energy for passivity-based dynamic movement primitives*; 2017 IEEE-RAS 17th International Conference on Humanoid Robotics (Humanoids), Birmingham, 2017, pp. 136-142 (doi: 10.1109/HUMANOIDS.2017.8239548).

The open-loop and closed-loop control method according to the invention now provides for the above-derived energy models to be applied such that the energy transferred from the device 1 to the human M is restricted, and provides for the responsiveness level of the device 1 to be matched to movements of the human M according to plan.

Proceeding from Equation (20), it emerges that the controlled device 1, especially the robot, is passive in relation to the channels $(-\dot{x}_d, F)_r$ and $(\dot{x}_h, F)_t$. For the overall stability of the system, it is therefore necessary to passivate the effect/influence of the aforementioned channels on the system. One option for doing this lies in increasing a virtual energy tank that has been defined for these channels since a design of a virtual energy tank according to plan amounts to a limitation of the overall storage function S. The stability of the overall system is ensured if the overall storage function S (corresponding to the overall energy of the system consisting of virtual and actual ("real") energy) is guaranteed to always be bounded.

What moreover arises from Equation (20) is that the energy flow between device 1 and human M depends directly on the overall storage function S. A high value of S can be interpreted as a large absolute value of stored energy which can be transferred to the human M whenever $P_h < 0$. According to Equation (21), this may be the case if the movement specified (generated) by the device 1 is counter to a force exerted by the human M. The size of the possible energy transfer from the device 1 to the human M can be restricted to a safe range by restricting the stored energy S. From the statements made above, it is possible to derive that there is an absolute upper boundary for the overall storage function S (=overall energy), which meets both stability and safety requirements. Consequently, it is possible to define any limit $S_{max}$ between the value of 0 and the aforementioned absolute upper boundary. The precise choice of $S_{max}$ influences the responsiveness level of the device 1 to deviations between the movement of the human M and the desired, specified movement of the device 1, especially of the robot or of the movement module 50 of the device 1.

Under the assumption of $S_{ee} \ll S_r$, Equations (11) and (19) yield that the overall storage function S is predominantly determined by the size of the tracking error variables $\tilde{x}$ and $\dot{\tilde{x}}$. The values of these variables can in turn only be reduced on the control side by changing the specified trajectory in line with the movement of the human M. For the application, this means that the result of choosing a smaller value for $S_{max}$ leads to the device 1 becoming more responsive within the scope of an interaction with the human.

d) Energy-Based Movement Generator

The overall storage function S cannot be controlled directly because it is a function of the unpredictable movement of the human M, that is to say $S = f(\dot{x}_h, F_h)$, as emerges from Equations (20) and (21). However, as emerges from Equation (13), S can be controlled, or expressed differently "shaped", indirectly by way of $P_{in}$, by adjusting $x_d$ using $(S - S_{max})$ as a reference. In this case, consideration has to be given to the fact that controlling or shaping the energy should not change the trajectory pattern specified by a therapist or the desired trajectory amplitude, but only the speed of the desired movement. In theory, the trajectory pattern can be specified in any way; however, especially for demonstration purposes, the use of a smooth sinusoidal function $$x_d = 0.5A(1 - \cos(2\pi\phi)) \tag{22}$$

$$\dot{x}_d = \Omega A \pi \sin(2\pi\phi) \tag{23}$$

has proven its worth, where $A \in R_{\geq 0}$ describes the amplitude and $\Omega \in R_{\geq 0}$ describes the frequency of the desired cyclical movement. The periodic phase $\phi \in [0,1]$ describes the advance of the movement within a cycle and is determined for any time t by $$\phi = \int_{t_0}^{t} \Omega dt' \tag{24}$$

where $t_0$ describes the start time of the cyclical movement.

It is evident from Equations (22) and (23) that the desired speed and ultimately also the energy of the overall system can be controlled or shaped by adjusting $\Omega$ while a specified trajectory amplitude is taken into account. Moreover, the phase value $\phi$ can also be used to determine when the leg of a human M has run through a full movement cycle, in order to thereupon trigger the movement of the other leg. This advantageously prevents independent and chaotic movement profiles of the legs in relation to one another.

A movement adjustment law for smoothly adjusting 2 can finally be as follows:

$$\Omega = \begin{cases} \gamma_p & \text{if } S_{max} \le S \wedge P_{in} < 0 \\ 1 + \dfrac{\gamma_p - 1}{2}\left[1 + \cos\left(\dfrac{S_{max} - S}{S_\Delta}\pi\right)\right] & \text{if } S_{max} - S_\Delta < S < S_{max} \wedge P_{in} < 0 \\ 1 & \text{if } S \le S_{max} - S_\Delta \\ 1 + \dfrac{\gamma_n + 1}{2}\left[1 + \cos\left(\dfrac{S_{max} - S}{S_\Delta}\pi\right)\right] & \text{if } S_{max} - S_\Delta < S < S_{max} \wedge P_{in} > 0 \\ -\gamma_n & \text{if } S_{max} \le S \wedge P_{in} > 0 \end{cases} \quad (25)$$

where $S_{max}-S\Delta$ describes the limit for S where the energy control or shaping starts, and $\gamma_p$ and $\gamma_n$ denote the maximum permitted positive and negative value for $\Omega$, respectively.

Alternatively, a preferred movement adjustment law for smoothly adjusting £2 according to the invention can also be as follows:

$$\Omega = \begin{cases} \gamma_p & \text{if } S_{max} \le S \wedge P_{in} < 0 \\ 1 + \dfrac{\gamma_p - 1}{2}\left[1 + \cos\left(\dfrac{S_{max} - S}{S_\Delta}\pi\right)\right] & \text{if } S_{max} - S_\Delta < S < S_{max} \wedge P_{in} < 0 \\ 1 & \text{if } S \le S_{max} - S_\Delta \\ 1 + \dfrac{1}{2}\left[1 + \cos\left(\dfrac{S_{max} - S_\Delta + \frac{S_\Delta - S_\delta}{2} - S}{\frac{S_\Delta - S_\delta}{2}}\pi\right)\right] & \text{if } S_{max} - S_\Delta < S < S_{max} - S_\Delta + \frac{S_\Delta - S_\delta}{2} \quad \wedge P_{in} > 0 \\ 0 & \text{if } S_{max} - S_\Delta + \dfrac{S_\Delta - S_\delta}{2} < S < S_{max} - \dfrac{S_\Delta - S_\delta}{2} \quad \wedge P_{in} > 0 \\ 1 + \dfrac{1}{2}\left[1 + \cos\left(\dfrac{S_{max} - S}{\frac{S_\Delta - S_\delta}{2}}\pi\right)\right] & \text{if } S_{max} - \dfrac{S_\Delta - S_\delta}{2} < S < S_{max} \quad \wedge P_{in} > 0 \\ -\gamma_n & \text{if } S_{max} \le S \wedge P_{in} > 0 \end{cases} \quad (25a)$$

Figure 2A:
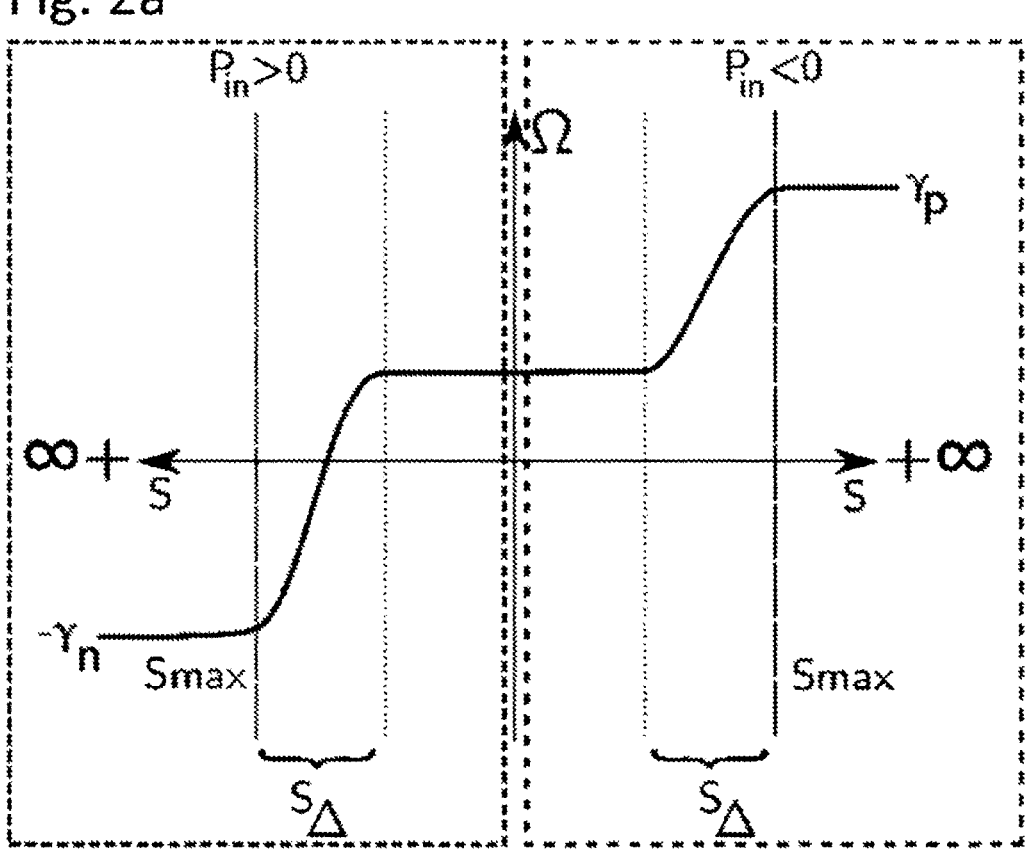
FIG. 2a shows a first example of a functional dependence of a control variable ($\Omega$) on an overall energy (S) as a controlled variable.
Figure 2B:
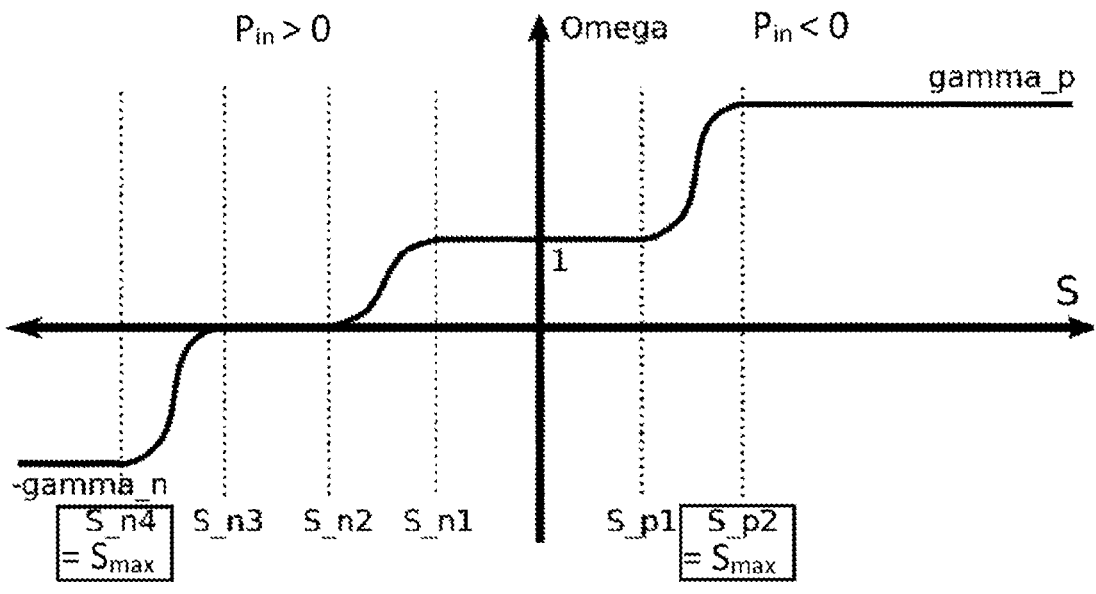
FIG. 2b shows a second example of a functional dependence of a control variable ($\Omega$) on an overall energy (S) as a controlled variable.

In this case, a region $S\delta$ in which the control variable $\Omega$ is set equal to zero is defined in the middle of the interval $S\Delta$ in the interval of $P_{in}>0$ (corresponding to the respective left side in the diagrams in FIGS. 2a and 2b).

FIGS. 2a and 2b show a first and second example, respectively, of a functional dependence of a control variable $\Omega$ on an overall energy S as a controlled variable.

The standard value for $\Omega$ is 1. If S exceeds the allowed limit, the control or change of $\Omega$ depends on the value of $P_{in}$, that is to say on the direction of the power flow. If $P_{in}>0$, that is to say the device 1 supplies energy to the system at the time the limit is exceeded, $\Omega$ is reduced in order to slow down or even reverse the desired, specified movement. If $P_{in}<0$, that is to say the energy limit is exceeded by virtue of the human M supplying energy to the system, $\Omega$ is increased in order to reduce the tracking error, i.e., $\tilde{x}$ and $\dot{\tilde{x}}$, as a result of which energy is taken from the system and the system is brought to a safer (stability) level. FIG. 2a shows $\Omega$ as a function of S according to Equation (25).

A second example of a functional dependence of the control variable $\Omega$ on an overall energy S as a controlled variable, especially as can be described by Equation (25a), is shown in FIG. 2b. In this case, the following relationship arises for the parameters of FIG. 2a (right) and FIG. 2b (left):

$$S_{p2} = S_{max}$$

$$S_{p1} = S_{max} - S_\Delta$$

$$S_{n1} = S_{max} - S_\Delta$$

$$S_{n2} = S_{max} - S_\Delta + \frac{s_\Delta - S_\delta}{2}$$

$$S_{n3} = S_{max} - \frac{s_\Delta - S_\delta}{2}$$

$$S_{n4} = S_{max}$$

Moreover, if $S\delta$ is set equal to zero ($S\delta=0$), the following arises:

$$\Omega = \begin{cases} \gamma_p & \text{if } S_{max} \leq S \wedge P_{in} < 0 \\ 1 + \dfrac{\gamma_p - 1}{2}\left[1 + \cos\left(\dfrac{S_{max} - S}{S_\Delta}\pi\right)\right] & \text{if } S_{max} - S_\Delta < S < S_{max} \wedge P_{in} < 0 \\ 1 & \text{if } S \leq S_{max} - S_\Delta \\ \left\{1 + \dfrac{1}{2}\left[1 + \cos\left(\dfrac{S_{max} - \frac{S_\Delta}{2} - S}{\frac{S_\Delta}{2}}\pi\right)\right]\right\} & \text{if } S_{max} - S_\Delta < S < S_{max} - \dfrac{S_\Delta}{2} \wedge P_{in} > 0 \\ \left\{1 + \dfrac{\gamma_n}{2}\left[1 + \cos\left(\dfrac{S_{max} - S}{\frac{S_\Delta}{2}}\pi\right)\right]\right\} & \text{if } S_{max} - \dfrac{S_\Delta}{2} < S < S_{max} \qquad \wedge P_{in} > 0 \\ -\gamma_n & \text{if } S_{max} \leq S \wedge P_{in} > 0 \end{cases}$$

(25b)

where now $$S_{p2} = S_{max}$$

$$S_{p1} = S_{max} - S_\Delta$$

$$S_{n1} = S_{max} - S_\Delta$$

$$S_{n2} = S_{n3} = S_{max} - \dfrac{S_\Delta}{2}$$

$$S_{n4} = S_{max}$$

applies.

To set different response thresholds ("responsiveness levels") of the device 1, it is possible in particular to choose the following values for the parameters or relationships between the parameters:

| Responsiveness level | | | |
|---|---|---|---|
| high | $\gamma_p = 2; \gamma_n = 1$ | $S_{n1} = S_{p1}$ $S_{n2} = 2.5S_{p1}$ $S_{n3} = 2.5S_{p1}$ $S_{n4} = 4S_{p1}$ | $S_{p2} = S_{p1}$ |
| middle | $\gamma_p = 2; \gamma_n = 1$ | $S_{n1} = S_{p1}$ $S_{n2} = 2S_{p1}$ $S_{n3} = 3S_{p1}$ $S_{n4} = 4S_{p1}$ | $S_{p2} = 2S_{p1}$ |
| low | $\gamma_p = 1; \gamma_n = 0$ | $S_{n1} = S_{p1}$ $S_{n2} = 2S_{p1}$ $S_{n3} = 3S_{p1}$ $S_{n4} = 4S_{p1}$ | $S_{p2} = 2S_{p1}$ |

Here, the value $S_{p2}$ corresponds to the value $S_{max}$ from FIG. 2*a*. The value $S_{p1}$ corresponds to the difference $S_{max}-S\Delta$ and, as is evident from the table above, can be used to set all parameters $S_{nx}$ on the side with $P_{in}>0$. The advantage of this control scheme for the control variable $\Omega$ consists in the fact that, in contrast to the scheme of FIG. 2*a*, the zero crossing of $\Omega(S)$ on the left-hand side ($P_{in}>0$) is not a point of intersection but an "interval of intersection" (=interval with $\Omega=0$). The zero crossing of $\Omega(S)$, that is to say the change in sign from $\Omega(S)<0$ to $\Omega(S)>0$, corresponds to a change in direction of the movement specified by the device 1. In the case illustrated in FIG. 2*b*, this change in direction is not sudden, as in FIG. 2*a*, but smoother and hence more comfortable for the human M.

Moreover, there can be further parameter specifications for obtaining certain device properties. For example, the value $\gamma_n$ can be set equal to zero in a first case, making it impossible for the patient to (inadvertently) reverse the specified movement direction. Secondly, setting the parameters $S_{n2}$ and $S_{n3}$ equal may lead to a destabilization of the movement of the device 1.

The previously described adjustment of the control variable $\Omega$, and hence the open-loop and closed-loop control of the assistance action by the device 1 operated by the method according to the invention, is based purely on energy considerations. However, the factor time can also be considered for the purposes of extending the present method.

In this variant of the method according to the invention, the control variable $\Omega$ is defined as follows:

$$\Omega = \begin{cases} \gamma_p & \text{if } S_{max} \cdot \zeta \leq S \wedge P_{in} < 0 \\ 1 + \dfrac{\gamma_p - 1}{2}\left[1 + \cos\left(\dfrac{S_{max} \cdot \zeta - S}{S_\Delta}\pi\right)\right] & \text{if } S_{max} \cdot \zeta - S_\Delta < S < S_{max} \cdot \zeta \wedge P_{in} < 0 \\ 1 & \text{if } S \leq S_{max} \cdot \zeta - S_\Delta \\ 1 + \dfrac{\gamma_n + 1}{2}\left[1 + \cos\left(\dfrac{S_{max} \cdot \zeta - S}{S_\Delta}\pi\right)\right] & \text{if } S_{max} \cdot \zeta - S_\Delta < S < S_{max} \cdot \zeta \wedge P_{in} > 0 \\ -\gamma_n & \text{if } S_{max} \cdot \zeta \leq S \wedge P_{in} > 0 \end{cases}$$

(25c)

the chosen upper limit $S_{max}$ of the overall energy S always being multiplied by a factor $\zeta$ in this case, where $$\zeta = \begin{cases} 1 & \text{if } \bar{t} < \tau \\ e^{\bar{t}-\tau} & \text{for all other values of } \bar{t} \end{cases} \tag{25d}$$

The $\bar{t}$ factor in this case describes the time duration within a movement cycle during which the device 1 is at a standstill. This means that, if the device 1 is in motion (i.e., if the time derivative of the phase $\bar{t}$ value $\dot{\phi} \neq 0$), the factor equals zero. As soon as the device 1 stops, for example on account of resistance by the patient (human M) (time $\bar{t}$ derivative of the phase value $\dot{\phi} \approx 0$), the factor grows with time. In this case, the parameter $\tau$ describes the maximum permitted time duration for which the device 1 may remain at a standstill. In practice this means that if a patient (human M) is unable to follow the specified movement of the device 1, for example because their health is currently too poor, and the device 1 stops the executed movement as a result, then the device 1 is able to remain at a standstill for up to a time duration of $\tau$ seconds. Since the limit $S_{max}$ grows exponentially when Equations (25c) and (25d) are taken into account, the current value of the overall energy S falls into an interval for which the control variable $\Omega = 1$ after this time duration $\tau$ expires. Consequently, the device 1 then continues movement at a normal speed.

III) Iterative Learning Process of the Control

As already described above, high values of $S_{max}$ correspond to a low responsiveness level of the device 1 to movements of the human M, and vice versa. Therefore, the desired, specified movement is not adjusted in the case of high values of $S_{max}$. Instead, the human M is pulled along by the device 1, especially by the robot or the movement module 50 of the device 1, in accordance with the movement trajectory/trajectory specified by a therapist, with the extent of the active participation or even of a possible resistance against the specified movement (in each case represented by the variable $P_h$) by said human being taken into account. Such control is useful in cases where the human M is not capable of independently moving their legs and requires significant or complete assistance by the device 1. However, if the value of $S_{max}$ is reduced, the responsiveness level of the device 1 with regard to the human M increases (=the device 1 reacts quicker), meaning that the desired, specified movement is adjusted if the human M does not participate or exerts resistance to the specified movement. In this case, the movement of the device 1 is slowed down, stopped or reversed until the human M actively starts to follow the specified movement. A preferred way of realizing this consists in a reduction of the interaction force between leg/legs and the device 1.

Within the scope of a rehabilitation, the choice of the value $S_{max}$ depends on the health of the human M, the intention being to give consideration to the fact that an active involvement may have an advantageous effect on the healing process and may prevent the risk of an occurrence of further complications. For this reason, a control with small values of $S_{max}$ is advantageous for humans M with a relatively high inherent strength who are capable of acting on the device 1, especially on the robot or the movement module 50 of the device 1, independently. However, if a human M is unable to actively participate in the movement, the value of $S_{max}$ must be kept at a large value in order to carry out a therapy movement. The optimal value for $S_{max}$ consequently arises from the lowest value for the respective human M at which the desired, specified movement is only altered minimally. If $S_{max}$ is continuously adjusted in accordance with this rule, the variable $S_{max}$ can consequently be used as a measure for the ability of the human to participate in the specified movement.

Moreover, it should be borne in mind that the strength or the ability of the human M to participate may change while carrying out a movement, for example on account of tiredness or circulatory changes, and so this may render continually changing the assistance level by the device 1, that is to say continually changing the responsiveness level, necessary. For an optimal assistance of a human M, especially a patient, during a (therapy) movement, $S_{max}$ should accordingly be adjusted to the current ability of the human M to participate during the entire performance of the movement. In this case, the participation state of the human M can be monitored by additional sensors, especially within the scope of electromyography (EMG). However, as shown below, the participation state can also be determined by a learning algorithm of the device 1, advantageously without the use of further sensors.

Figure 3:
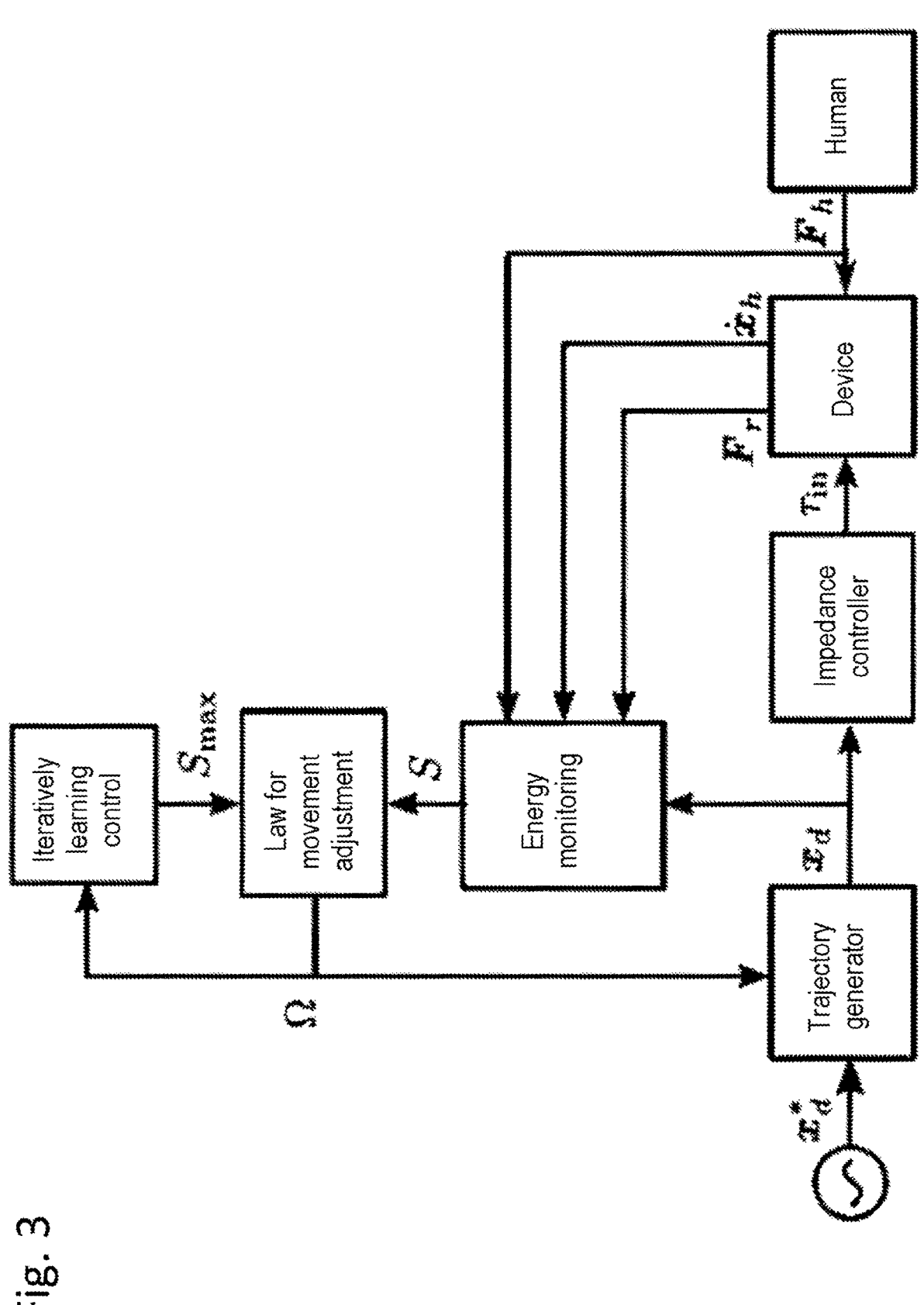
FIG. 3 shows a block diagram of an exemplary learning process within the scope of the method according to the invention.

FIG. 3 shows a block diagram of an exemplary learning process within the scope of the method according to the invention.

A comparatively high value for $S_{max}$ is chosen at the start of a therapy session. This value is set so high that the device 1 fully assists the human M with the movement such that the law for the adjustment to a desired, specified movement according to Equation (25) is thus not "triggered" and $\Omega$ maintains the value of 1. Within the scope of the session, the value of $S_{max}$ is iteratively reduced with each run-through cyclical movement (that is to say, a forgetting algorithm ("forgetting process") is used) for as long as $\Omega$ maintains the value of 1. Since reducing the value of $S_{max}$ increases the sensitivity of the device 1 to the participation of the human M in the movement (i.e., the responsiveness level), this makes it possible to successively determine a value for $S_{max}$ which is small enough so that the human M is no longer capable of following the specified movement accurately enough, thus "triggering" the control variable $\Omega$ by a deviation from the value of 1. Should this be the case, $S_{max}$ is increased for the next movement iteration (that is to say, a learning process takes place). By measuring the value of the control variable $\Omega$ during each iteration (=each movement iteration), it is thus possible to determine the participation state of the human M and accordingly adjust the value for $S_{max}$. Mathematically, this learning process following the i-th iteration can be described as follows:

$$S_{max,i+1} = S_{max,i} + K_i(1+\overline{\Omega}_i) - K_f \tag{26}$$

where $\overline{\Omega}_i$ describes the average of all values of $\Omega$ during the i-th iteration, and $\kappa_i$ and $\kappa_f$ denote a learning and forgetting factor, respectively. In this case, $\kappa_i >> \kappa_f$ is preferably chosen so that the learning factor $\kappa_i$ is weighted more.

Such an iterative learning process is shown in exemplary fashion in FIG. 3 on the basis of a block diagram. The original trajectory $x_d^*$ is adjusted in the trajectory generator on the basis of the energy stored in the system and the maximum permitted energy which has been learnt.

An extension of the described open-loop and closed-loop control method may moreover now consist in allowing a therapist to categorize the mode of operation of the device 1 into different areas (regions $\Phi_i$) on the basis of the muscles or muscle groups to be activated or trained, and to set the extent of assistance ("assistance level") or the mode of operation of the device 1 for each of these regions $\Phi_i$ in a targeted manner. The extent of assistance, that is to say the "assistance level", of the device 1 is defined here as a smooth function which avoids interruptions in the movement of the device 1 where possible. According to the invention, such an open-loop and closed-loop control can preferably be based on a division into regions $\Phi_i$ on the basis of the phase value $\phi$, as defined in Equation (24).

Figure 5:
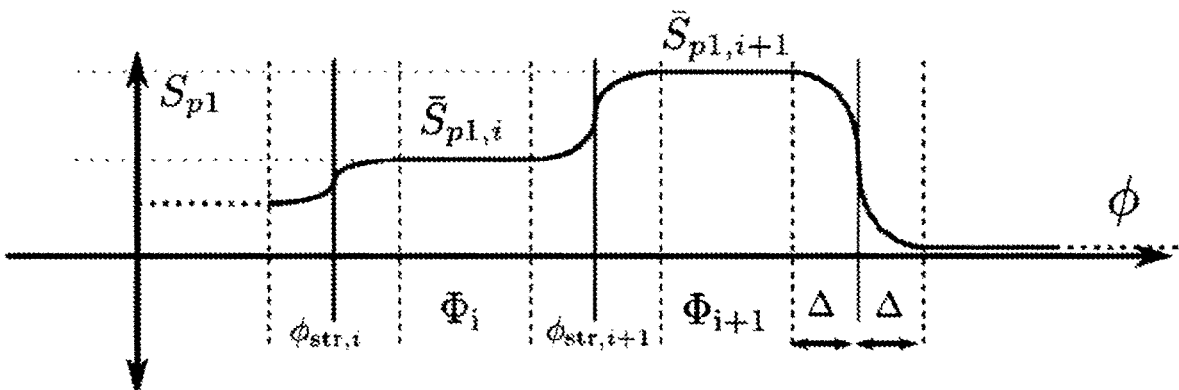
FIG. 5 shows an example of a ($\phi$–$S_{p1}(=S_{max})$) curve for an open-loop and closed-loop control of a device according to the invention, said control depending on a phase value ($\phi$).

FIG. 5 shows an example of a $(\phi\text{-}S_{p1}(=S_{max}))$ curve for an open-loop and closed-loop control of a device 1 according to the invention, said control depending on a phase value ($\phi$).

In this case, the region $\Phi_i$ describes the phase value interval from $\phi_{str,\ i}$ to $\phi_{str,\ i+1}$. To prepare a movement therapy, the therapist can set the regions in accordance with the needs of the respective patient, in particular there can be a division into four regions $\Phi_i$, with $\phi_{str,\ 1}=0$, $\phi_{str,\ 2}=0.25$, $\phi_{str,\ 3}=0.5$, $\phi_{str,\ 4}=0.75$, $\phi_{str,\ 5}=1$. Now, an independent limit $S_{max,\ i}$ ($\phi$) can be defined for each of these regions $\Phi_i$, with the following applying to all phase values $\phi_i$ of a region $\Phi_i$:

$$S_{max}(\phi) = \begin{cases} \dfrac{\overline{S}_{max,i} + \overline{S}_{max,i-1}}{2} + \dfrac{\overline{S}_{max,i} + \overline{S}_{max,i-1}}{2}\sin\left(\pi\dfrac{\phi - \phi_{str,i}}{2\Delta}\right) & \text{if } \phi < \phi_{str,i} + \Delta \\[2ex] \dfrac{\overline{S}_{max,i} + \overline{S}_{max,i-1}}{2} + \dfrac{\overline{S}_{max,i} + \overline{S}_{max,i+1}}{2}\sin\left(\pi\dfrac{\phi_{str,i+1} - \phi}{2\Delta}\right) & \text{if } \phi < \phi_{str,i+1} - \Delta \\[2ex] \overline{S}_{max,i} & \text{for all other values of } \phi \end{cases} \quad (27)$$

The value is linked here to the respective region $\Phi_i$ and can be improved (adjusted and optimized for the therapy progress) during the movement therapy by way of an iterative learning process, especially as described above. In this case, the so-called smoothing interval $\Delta \geq 0$ preferably has a smaller value range of phase values $\phi$ than the respective region $\Phi_i(\phi)$. In particular, the smoothing interval $\Delta$ may comprise one tenth of the phase values $\phi$ of the corresponding region $\Phi_i(\phi)$.

In the case of a split into for example four regions $\Phi_i(\phi)$ for each leg of the human M and a value range for the phase values $\phi$ from 0 to 1 for one leg (cf. Equation 24 in this respect), this may yield a length of in each case 0.25 "phase units" for the individual regions $\Phi_i(\phi)$ with a length of 0.025 "phase units" of the smoothing interval $\Delta$.

Finally, as a further improvement of the iterative learning process for determining an initial limit $S_{init}(\phi)$, the device 1 can initially run through n movement cycles without a given limit $S_{max}$, the number n of movement cycles being in the interval of $2 \leq n \leq 5$ movement cycles, preferably being 3 movement cycles. In this case, an $S(\phi)$ profile is preferably recorded, and a mean value of the recorded $S(\phi)$ values is subsequently calculated as an initial limit $S_{init}(\phi)$. This initial limit $S_{init}(\phi)$ is then used as a start value for the limit ($S_{max}$) in a first iteration step of the iterative learning process, especially as described above, in the form $\lambda \cdot S_{init}(\phi)$ with $\lambda \geq 1$. This automatic determination of the initial limit $S_{init}(\phi)$ as "first value for $S_{max}$" advantageously allows a suitable start value for different patients with very different starting points in respect of their health to be determined individually, reliably and quickly.

The present invention relates to a method for open-loop and closed-loop control of a device 1, at least comprising a movement module 50, in terms of its interaction with a human M, said method being based on an energy-based control scheme that makes it possible to monitor the amount of an overall energy (S) in the system comprising the device 1 and the human M in dependence on a measured control variable $\Omega$ describing the speed at which the device 1 or its movement module 50 moves. The method advantageously considers the entire power cycle, in particular the dynamics of the energy or power flow, in the system comprising the device 1 and the human M and takes into account the performance of the human M during the closed-loop control. The method also advantageously enables the participation state of the human M who is using the device 1 to be determined in an iterative learning process without additional sensors.

LIST OF REFERENCE SIGNS

1 Device
11 Control unit
30 Rehabilitation mechanism
50 Movement module
51 Force sensor
52 Angle sensor
$\dot{x}_d$ Time derivative (velocity) of the Cartesian coordinates for describing the movement trajectory S Overall energy (overall storage function)
$S_{max}$ chosen limit of the overall energy S
$P_{in}$ the power input into the system generated by the movement generator
$P_h$ the power supplied to the system of device (1) and human (M) by the human (M)
$P_{diss}$ the power lost by control damping
M Human

The invention claimed is:

1. A method for open-loop and closed-loop control of a device, at least including a movement module, in terms of an interaction of the device with a human, the method comprising:

defining an energy network formed at least of:
a first power component describing an amount of energy per unit time supplied by the device to an overall energy of a system of the device and the human;
a second power component describing an amount of energy per unit time lost by the device by way of internal open-loop and closed-loop control processes outside of work to be carried out primarily aided by the movement module; and
a third power component describing an amount of energy per unit time supplied by the human to the overall energy;

defining the overall energy of the energy network of the system of the device and the human as a controlled variable;

defining a speed with which the device interacts with the human by way of the movement module as a control variable, with the movement module intended to traverse a desired trajectory;

causing the overall energy of the energy network to:
increase as more movement independently carried out by the human deviates from a movement along the trajectory initially specified by the device; and decrease again as the movement independently carried out by the human approaches the movement along the trajectory initially specified by the device;

determining the overall energy of the energy network during the movement of the movement module, and varying the control variable during the movement of the movement module, depending on the determined overall energy, causing the overall energy to:

remain in an interval of S≤Smax−SΔ when located in the interval, or approach the interval S≤Smax−SΔ again when located in an interval of S>Smax−SΔ, where:

Smax=a chosen upper boundary of the overall energy; and

SΔ=Smax−Sx1, where Sx1 represents individual values of the controlled variable or the overall energy S and x=n is used to designate values in an interval with Pin>0 and x=p is used to designate values in an interval with Pin<0.

2. The method according to claim 1, which further comprises:

using the device as a rehabilitation mechanism configured for a rehabilitation of at least joints, muscles and tendons of lower extremities of a human according to plan;

bringing the movement module into an operative connection with the lower extremities of the human; and $$\Omega = \begin{cases} \gamma_p & \\ 1 + \dfrac{\gamma_p - 1}{2}\left[1 + \cos\left(\dfrac{S_{max} - S}{S_\Delta}\pi\right)\right] & \\ 1 & \\ \left[1 + \dfrac{1}{2}\left[1 + \cos\left(\dfrac{S_{max} - S_\Delta + \dfrac{S_\Delta - S_\delta}{2} - S}{\dfrac{S_\Delta - S_\delta}{2}}\pi\right)\right]\right] & \\ 0 & \\ 1 + \dfrac{1}{2}\left[1 + \cos\left(\dfrac{S_{max} - S}{\dfrac{S_\Delta - S_\delta}{2}}\pi\right)\right] & \\ -\gamma_n & \end{cases}$$

if $S_{max}S\Lambda P_{in} < 0$ if $S_{max} - S_\Delta < S < S_{max}\Lambda P_{in} < 0$ if $S \le S_{max} - S_\Delta$ if $S_{max} - S_\Delta < S < S_{max} - S_\Delta + \dfrac{S_\Delta - S_\delta}{2} \qquad \Lambda P_{in} > 0$ if $S_{max} - S_\Delta + \dfrac{s_\Delta - S_\delta}{2} < S < S_{max} - \dfrac{S_\Delta - S_\delta}{2} \qquad \Lambda P_{in} > 0$ if $S_{max} - \dfrac{S_\Delta - S_\delta}{2} < S < S_{max} \qquad \Lambda P_{in} > 0$ if $S_{max} \le S\Lambda P_{in} > 0$ where:

$\gamma_p$=maximum permitted positive value for the control variable;

$\gamma_n$=maximum permitted negative value or absolute value for the control variable;

S=overall energy of the system of the device and the human;

$S_{max}$=chosen upper boundary of the overall energy;

$S\Delta = S_{max} - S_{p\_x}$, where $S_{p\_x}$ represents individual values of the controlled variable S; and Sδ=region in the middle of SΔ for which the control variable is set equal to zero, where $P_{in}>0$.

5. The method according to claim 1, which further comprises defining the control variable as:

$$\Omega = \begin{cases} \gamma_p & \\ 1 + \dfrac{\gamma_p - 1}{2}\left[1 + \cos\left(\dfrac{S_{max}\cdot\zeta - S}{S_\Delta}\pi\right)\right] & \\ 1 & \\ 1 + \dfrac{\gamma_n + 1}{2}\left[1 + \cos\left(\dfrac{S_{max}\cdot\zeta - S}{S_\Delta}\pi\right)\right] & \\ -\gamma_n & \end{cases}$$

if $S_{max}\cdot\zeta \le S\Lambda P_{in} < 0$ if $S_{max}\cdot\zeta - S_\Delta < S < S_{max}\cdot\zeta\Lambda P_{in} < 0$ if $S \le S_{max}\cdot\zeta - S_\Delta$ if $S_{max}\cdot\zeta - S_\Delta < S < S_{max}\cdot\zeta\Lambda P_{in} > 0$ if $S_{max}\cdot\zeta \le S\Lambda P_{in} > 0$ providing the movement module with:

at least one force sensor for measuring an absolute value of a force between the movement module and the lower extremity of the human, and at least one angle sensor for measuring a direction of the force between the movement module and the lower extremity of the human.

3. The method according to claim 1, which further comprises defining the control variable as:

$$\Omega = \begin{cases} \gamma_p & \\ 1 + \dfrac{\gamma_p - 1}{2}\left[1 + \cos\left(\dfrac{S_{max} - S}{S_\Delta}\pi\right)\right] & \\ 1 & \\ 1 + \dfrac{\gamma_n + 1}{2}\left[1 + \cos\left(\dfrac{S_{max} - S}{S_\Delta}\pi\right)\right] & \\ -\gamma_n & \end{cases}$$

if $S_{max}S\Lambda P_{in} < 0$ if $S_{max} - S_\Delta < S < S_{max}\Lambda P_{in} < 0$ if $S \le S_{max} - S_\Delta$ if $S_{max} - S_\Delta < S < S_{max}\Lambda P_{in} > 0$ if $S_{max} \le S\Lambda P_{in} > 0$ where:

$\gamma_p$=maximum permitted positive value for the control variable;

$\gamma_n$=maximum permitted negative value or absolute value for the control variable;

S=overall energy of the system of the device and the human;

$S_{max}$=chosen upper boundary of the overall energy; and $S\Delta = S_{max} - S_{p\_x}$, where $S_{p\_x}$ represents individual values of the controlled variable S.

4. The method according to claim 1, which further comprises defining the control variable as:

where:

$\gamma_p$=maximum permitted positive value for the control variable;

$\gamma_n$=maximum permitted negative value or absolute value for the control variable;

S=overall energy of the system of the device and the human;

$S_{max}$=chosen upper boundary of the overall energy;

$S\Delta=S_{max}\cdot\zeta-S_{p\_x}$, where $S_{p\_x}$ represents individual values of the controlled variable S;

$$\zeta = \begin{cases} 1 & \text{if } \bar{t} < \tau \\ \varrho^{\bar{t}<\tau} & \text{for all other values of } \bar{t} \end{cases}$$

where $\bar{t}$=time during which the device (1) is at a standstill;

$\tau$=maximum time the device (1) is permitted to be at a standstill.

6. The method according to claim 1, which further comprises damping the variation of the control variable during the movement of the movement module based on the determined overall energy or by implementing at least one of a filter, a rate restriction or a limitation of an absolute value of a first derivative of the control variable with respect to the overall energy.

7. The method according to claim 1, which further comprises:

defining the overall energy of the system of the device and the human, or including a virtual absolute energy value and an actual absolute energy value, as an overall storage function $S=S_{ce}$ or as an overall storage function $S=S_{ce}+S_{ee}$; and defining the energy storage function of the control deviation as:

$$S_{ee} = \frac{1}{2}\dot{\tilde{x}}^T M_C(q)\dot{\tilde{x}} + \frac{1}{2}\tilde{x}^T K_x \tilde{x}.$$

where:

$S_{ce}$=control error energy storage function;

$M_C(q)$=the Cartesian moment of inertia matrix;

$K_x$=the Cartesian stiffness matrix; and $S_{ee}$=overall energy of an end effector of the device or of the movement module formed of kinetic and potential energy.

8. The method according to claim 7, which further comprises:

determining the energy storage function by way of the first power component, and combining the first power component by calculation with the second power component; or calculating the energy storage function by way of an interaction force between the device and the human, or measuring the energy storage function by using a force sensor for measuring an absolute value of a force between the movement module and the lower extremity of the human.

9. The method according to claim 7, which further comprises determining a time derivative of the overall storage function as $\dot{S}=P_{in}+P_h-P_{diss}$, where:

$P_{in} \in R$=power input into the system generated by a movement generator;

$P_{diss} \in R$=power lost by control damping; and $P_h$=power supplied to the system of the device and the human by the human.

10. The method according to claim 1, which further comprises determining a limit to be chosen for carrying out a movement by way of an iterative learning process by the device while the movement is carried out, the limit being for at least one of the overall storage function corresponding to the overall energy or a variable $S\Delta=S_{max}-S_{p\_x}$, where $S_{p\_x}$ are individual values of the overall energy; and changing at least one of a learning factor or a forgetting factor for determining a participation state of the human in the movement specified by the device over time, or changing linearly over time, within a scope of the iterative learning process until at least one of the learning factor or the forgetting factor has reached a final value defined in advance.

11. The method according to claim 10, which further comprises:

choosing a value for the limit in a first iteration step, when the device fully assists the human with carrying out the movement and the control variable has a value of 1;

reducing the value of the limit in each further iteration step for as long as the control variable maintains the value of 1; and when the control variable deviates from the value of 1, increasing the value of the limit again in a next iteration step.

12. The method according to claim 10, which further comprises determining an initial limit by:

initially running the device through n movement cycles without a given limit, providing a number n of movement cycles in an interval of $2 \le n \le 5$ movement cycles or providing 3 movement cycles;

recording an S profile;

subsequently calculating a mean value of the recorded S values as the initial limit, serving as a start value for the limit in a first iteration step of the iterative learning process in a form $\lambda \cdot S_{init}$ with $\lambda \ge 1$; and scaling at least one of the learning factor or the forgetting factor for determining a participation state of the human in the movement specified by the device based on the initial limit when initializing the iterative learning process.

13. The method according to claim 12, which further comprises choosing a limit for carrying out a movement, the limit being for the overall storage function corresponding to the overall energy and being split into regions based on a phase value describing a movement progress within a movement cycle of the device and determining an initial limit for each region.

14. The method according to claim 1, which further comprises:

choosing a limit for carrying out a movement, the limit being for the overall storage function corresponding to the overall energy, and being:

split into regions based on a phase value describing the movement progress within a movement cycle of the device, with a region describing the phase value interval from $\phi_{str,\ i}$ to $\phi_{str,i+1}$, and defining the limit to be chosen independently for each region, with the following applying to all phase values of a region:

$$S_{max}(\phi) = \begin{cases} \dfrac{\overline{S}_{max,i} + \overline{S}_{max,i-1}}{2} + \dfrac{\overline{S}_{max,i} + \overline{S}_{max,i-1}}{2}\sin\left(\pi\dfrac{\phi - \phi_{str,i}}{2\Delta}\right) & \text{if } \phi < \phi_{str,i} + \Delta \\[3mm] \dfrac{\overline{S}_{max,i} + \overline{S}_{max,i-1}}{2} + \dfrac{\overline{S}_{max,i} + \overline{S}_{max,i+1}}{2}\sin\left(\pi\dfrac{\phi_{str,i+1} - \phi}{2\Delta}\right) & \text{if } \phi < \phi_{str,i+1} - \Delta \\[3mm] \overline{S}_{max,i} & \text{for all other values of } \phi \end{cases}$$

where $\Delta > 0$ describes a smoothing interval including a smaller value range of phase values than the regions, or a tenth of the phase values of the corresponding region; and $\overline{S}_{max,i}$ being a limit associated with a respective region.

15. A device, comprising:

a rehabilitation mechanism configured for a rehabilitation of at least joints, muscles and tendons of lower extremities of a human according to plan;

a movement module configured to be brought into an operative connection with the lower extremities of the human, said the movement module including:

at least one force sensor for measuring an absolute value of a force between said movement module and the lower extremity of the human, and at least one angle sensor for measuring a direction of the force between said movement module and the lower extremity of the human; and a control unit configured for open-loop and closed-loop control of the device according to the method of claim 1.

\* \* \* \* \*